(12) United States Patent
Edwards

(10) Patent No.: US 9,203,286 B2
(45) Date of Patent: Dec. 1, 2015

(54) MAGNETIC SHIELD

(71) Applicant: ROLLS-ROYCE PLC, London (GB)

(72) Inventor: Huw Llewelyn Edwards, Derby (GB)

(73) Assignee: ROLLS-ROYCE plc, London (GB)

( * ) Notice: Subject to any disclaimer, the term of this patent is extended or adjusted under 35 U.S.C. 154(b) by 88 days.

(21) Appl. No.: 13/627,345

(22) Filed: Sep. 26, 2012

(65) Prior Publication Data

US 2013/0083443 A1    Apr. 4, 2013

(30) Foreign Application Priority Data

Oct. 3, 2011   (GB) .................................. 4446948.9

(51) Int. Cl.
| | | |
|---|---|---|
| H01L 39/24 | (2006.01) | |
| H02K 11/00 | (2006.01) | |
| H02K 55/00 | (2006.01) | |

(52) U.S. Cl.
CPC ............ *H02K 11/0005* (2013.01); *H02K 55/00* (2013.01); *Y02E 40/62* (2013.01); *Y02E 40/625* (2013.01); *Y10T 29/49014* (2015.01)

(58) Field of Classification Search
CPC ..... H01H 47/24; H01H 35/24; H01H 50/021; H01F 27/40; H01J 40/14; H01L 39/143; H01L 39/248; H01L 39/02; H01L 23/552; H02K 11/0005; H02K 55/00; Y02E 40/62
USPC ...................................... 361/19; 505/121, 230
See application file for complete search history.

(56) References Cited

U.S. PATENT DOCUMENTS

| | | | | |
|---|---|---|---|---|
| 3,242,418 | A | * | 3/1966 | Mela et al. ....................... 322/28 |
| 3,764,835 | A | * | 10/1973 | Luck et al. ....................... 310/52 |
| 4,032,959 | A | * | 6/1977 | Boom et al. ................... 323/234 |
| 4,171,494 | A | * | 10/1979 | Yamaguchi et al. ............. 310/52 |
| 4,174,483 | A | * | 11/1979 | Vinokurov et al. .............. 310/52 |
| 4,262,412 | A | * | 4/1981 | McDonald ....................... 29/599 |
| 6,486,393 | B1 | | 11/2002 | Matsuba et al. |
| 8,437,815 | B2 | * | 5/2013 | Vaucher ........................ 505/166 |
| 2004/0104632 | A1 | | 6/2004 | Keene et al. |
| 2008/0108504 | A1 | * | 5/2008 | Matsui et al. .................. 505/162 |
| 2009/0066184 | A1 | * | 3/2009 | Winn ............................. 310/217 |
| 2009/0273251 | A1 | | 11/2009 | Cordes et al. |

FOREIGN PATENT DOCUMENTS

| | | |
|---|---|---|
| JP | A-63-290102 | 11/1988 |
| JP | A-1-226200 | 9/1989 |
| JP | A-4-188893 | 7/1992 |
| JP | A-4-253399 | 9/1992 |
| JP | A-6-310897 | 11/1994 |
| JP | A-9-102694 | 4/1997 |
| JP | A-10-275945 | 10/1998 |
| JP | A-2000-258519 | 9/2000 |
| WO | WO 89/07321 | 8/1989 |

OTHER PUBLICATIONS

Jan. 27, 2012 Search Report issued in British Patent Application No. GB1116948.9.

* cited by examiner

*Primary Examiner* — Danny Nguyen
*Assistant Examiner* — Nicholas Ieva
(74) *Attorney, Agent, or Firm* — Oliff PLC

(57) ABSTRACT

A magnetic shielding arrangement, including: at least one magnetic flux source; a superconductor magnetic shield at least partially surrounding the magnetic flux source; a second shield at least partially surrounding the superconductor magnetic shield.

14 Claims, 1 Drawing Sheet

MAGNETIC SHIELD

TECHNICAL FIELD OF INVENTION

This invention relates to a magnetic shield. In particular, this invention relates to a magnetic shield for a superconducting machine.

BACKGROUND OF INVENTION

Superconducting magnets are becoming increasingly popular for electrical machines due to the high current densities they can withstand and the correspondingly high flux densities they can produce, often in the order of a few Tesla.

Although the high levels of flux densities are beneficial for increasing the torque densities of machines, shielding must be carefully utilised to contain the magnetic fields, particularly when the machines are located in sensitive environments. Such an environment would be an aerospace environment.

There are two methods commonly employed for magnetic shielding. The first of these include the use of high magnetic permeable shields which provide a magnetically permeable path for the magnetic flux which retains the magnetic fields within the machine. The second are eddy current shields which are generally electrically conductive layers which surround the machine and have eddy currents induced in them by the magnetic field radiating from the machine. These eddy currents set up opposing magnetic fields which retain the radiating field within the machine.

High permeability shields are beneficial as they will work on quasi-static and alternating fields and are made from readily available materials, ferromagnetic materials can also be used to house the machine. Further, the magnetic field is, in effect, reflected back into the machine which this leads to an increase in magnetic loading and torque density of the machine.

A downside to using high permeability materials is that the radial thickness required in the case of rotating machines is related to the strength of the field which needs to be shielded and the flux density saturation limits imposed by the high permeability material used in the shield. This results in prohibitively large shields, particularly in superconducting machines.

Eddy current shields are preferential for superconducting machines in that they can be made from a relatively inexpensive conductive material such as copper. As a rule they tend to be lighter than the high permeability alternatives, although this is dependent on the operating frequency of the machine.

Eddy current shields are disadvantageous in that they are only effective on moving fields above a particular frequency and the circulating eddy currents result in Joule heating losses in the shields. For large currents, this heat needs to be removed.

Other options include superconducting shields, which operate without loss (outside of providing the required cooling). However, superconducting shields are prone to failure during transient events where the shields experience an unexpectedly high magnetic field and quench as a result.

Although temporary failure of the shield may be acceptable in some circumstances, it is not acceptable for aero applications. Further, due to the fact that aero electrical systems generally have low inertia and large switching loads, they are prone to transients. This makes the use of current superconductor shields inappropriate.

This invention seeks to provide an improved magnetic shield for a superconducting machine.

STATEMENTS OF INVENTION

In a first aspect the present invention provides a magnetic shielding arrangement, comprising: at least one magnetic flux source; a superconducting magnetic shield at least partially surrounding the magnetic flux source; a second shield at least partially surrounding the superconductor magnetic shield.

Providing a superconducting shield and a second shield allows the magnetic shielding arrangement to be designed to withstand a number of possible fault conditions which could otherwise not be tolerated.

The magnetic flux source may be taken from the non-exclusive group comprising: an electromagnet, an electrical machine, a superconducting electrical machine, magnetic coupling, magnetic gearbox, superconducting magnetic gearbox, superconducting magnetic coupling, a bulk superconducting magnet or permanent magnet. The electromagnetic machine may be a motor-generator. The motor may include a rotor and a stator. The electromagnetic machine may be a superconducting machine. The superconducting electromagnetic machine may include a superconductor magnetic flux source. The superconductor magnetic flux source may include a winding constructed from a superconductor winding. The superconductor may be any taken from the group comprising: low or high temperature superconductors; type 1 or type 2 superconductors; Ceramics (Bismuth Strontium Calcium Copper Oxide (BSCCO), Yttrium Barium Copper Oxide (YBCO) or Magnesium Diboride MgB2), metals (Niobium), alloys (niobium-titanium), elements (e.g. mercury), organic superconductors (carbon nanotubes).

The second shield is constructed from a material having a high magnetic permeability.

The high magnetic permeability material may be ferromagnetic. The high permeability material may be a steel or a ferrite or a mu-metal (predominately nickel iron metal alloys, with some copper and molybdenum). The relative permeability ($\mu/\mu 0$) of the material may be higher than 800.

The second shield may be constructed from a non-superconducting electrically conductive material.

The electrically conductive material may be copper or aluminium. As such the electrically conductive material may have a high electrical conductivity. For example, the electrical conductivity may be above $5.96 \times 10^7 (S/m)$.

The magnetic shielding arrangement may further comprise a third shield.

The third shield may be substantially constructed from a high magnetic permeability material.

The electromagnetic machine arrangement may further comprise a thermal barrier between the superconductor magnetic shield and the second magnetic shield.

The thermal barrier may be a vacuum device or a cryostat or Dewar containing a refrigerant. The refrigerant may be liquid helium. The thermal barrier may comprise a low thermal conductivity material, and/or low thermal radiation material.

The superconductor magnetic shield may be exposed to a time varying magnetic field in use and the electromagnetic machine arrangement may further comprise at least one sensor for determining when the frequency or amplitude of the time varying magnetic field is outside a predetermined range.

The electrical machine may be configured to operate as a motor orgenerator and the superconductor magnetic flux source may be placed on the rotor, the rotor further comprising a non-superconductor winding for starting purposes.

The field strength may be reduced when at lower frequency (rotor field frequency being proportional to speed), which is when eddy current shields are least effective).

The superconductor magnetic shield may include a mesh of superconductor wires. Each superconductor wires may include superconductor filaments coated in a non-superconductor electrical conductor. The superconductor magnetic shield includes a plurality of layers.

In a second aspect, the invention provides a method of operating the magnetic shielding arrangement according to the first aspect, the method comprising the steps of: putting the superconductor magnetic shield in a superconducting state; energising or magnetising the magnetic flux source.

When the electrical machine includes at least one sensor for monitoring a condition of the a magnetic shielding arrangement, the method may further comprise the steps of: monitoring a condition of the magnetic shielding arrangement; and, controlling the magnetic field produced by the magnetic flux source in accordance with the monitored conditions such that the magnetic field is maintained within predetermined limits which can be tolerated by the shields. If containing the magnetic field from a generator, it could be envisaged that the current to the field winding on the rotor is only activated (using a control system) once the rotor speed (detected by a sensor) is high enough for the eddy current shield to function adequately.

DESCRIPTION OF DRAWINGS

Embodiments of the invention will now be described with the aid of the following drawings in which.

DETAILED DESCRIPTION OF INVENTION

Figure 1:
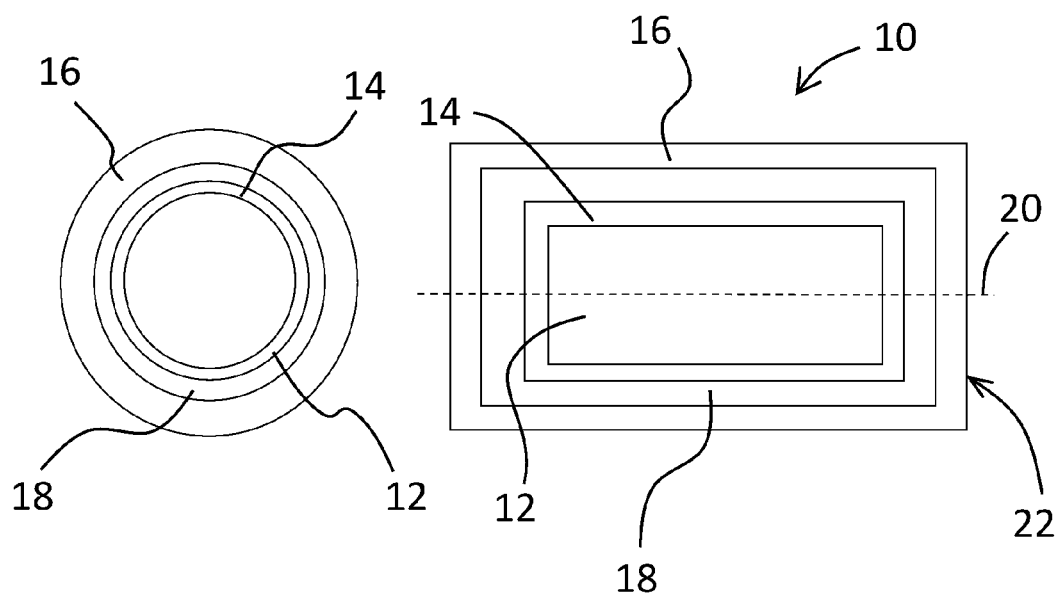
FIG. 1 shows a schematic cross sectional and axial view of a rotary superconducting electrical machine having the magnetic shield arrangement of the present invention.

FIG. 1 shows a magnetic shielding arrangement 10 according to the present invention. The arrangement includes a magnetic flux source in the form of a rotary electrical machine 12 which is substantially surrounded by a plurality of magnetic shields. The machine 12 of the embodiment, which is generally shown as a unified structure for the sake of clarity, includes a rotor which is rotatable around a longitudinal axis 20 and a coaxial stator which sits around the stator.

The machine 12 includes some form of superconductor magnetic flux source. This may be any suitable type as is known in the art, which in one example would be a superconducting rotor field winding. Such a machine would also include a stator winding (which is possibly superconducting as well) which magnetically interacts with the superconductor magnetic flux source to provide a rotational force on the rotor.

As mentioned above in the background section, the shielding requirements for superconducting machines are higher than normally conducting electromagnetic machines due to the high magnetic fields that they produce. The present invention provides a magnetic shield arrangement which is particularly suited to superconducting machines, but which can find utility in any device in which a high degree of efficient and reliable magnetic shielding is required.

The magnetic shielding arrangement of the embodiment includes a first, superconducting, shield 14 in the form of a cylindrical housing which sits proximate to the electrical machine and as such surrounds the superconducting magnetic flux source within the electrical machine 12. It also includes a second shield 16 which sits radially outwards of and surrounds the superconductor magnetic shield 14.

The radially outer surface of the superconductor shield 14 is adjacent a thermal barrier 18 for providing the required critical superconducting temperature for the superconducting shield 14 (and machine 12). Typically, this will be a vacuum device or cryostat containing a refrigerant such as liquid helium. Although not shown, the thermal barrier may include any necessary accessories such as a cryogen cooling system and any necessary ducting as is commonly known in the art.

The second shield 16 is located on the exterior of the thermal barrier 18 of the electrical machine.

Generally, both of the shields 14, 16 extend around the circumference of the electrical machine 12, to prevent leakage of a radial field, but also have radially extending portions 22 at the axial ends of the machine 12 which extend from the circumferential portions of the shield towards the longitudinal axis of the machine 12. The machine shown in FIG. 1 is represented as being entirely enveloped. However, as will be appreciated, the extent to which the machine 12 is enveloped in this way will be dependent on the geometry and type of machine which is being shielded and how it is supported.

The superconductor magnetic shield 14 operates on an eddy current principle in which the magnetic field which emanates from the magnetic flux source induces eddy currents within the shield 14. These eddy currents result in the radial magnetic field being redirected circumferentially due to well understood electromagnetic principles. In this way, the superconducting magnetic shield 14 prevents a leakage of the magnetic field to the surrounding environment under normal operating conditions.

The superconducting shield is formed as a mesh of superconducting filaments/wires connected in a grid of longitudinal and circumferential conductors all electrically connected together via the superconductor. The filaments/wires making up the mesh can include superconducting filaments which are coated in another metal, most likely copper or niobium, or alloys with a higher resistivity such as Cu—Al alloys and Cu—Ni alloys. The lengths of wire can then be twisted into groups along their length with the effect that the resistance across each filament of the mesh has a larger transverse resistance which is preferable for creating effective eddy currents.

In some embodiments, it will be beneficial to have several separate layers of superconducting mesh, separated by one of the coating materials above. This allows the filament sizes to be reduced (offering a reduction in AC losses) whilst maintaining a high current density in the screen.

The preferable alternative from an electrical resistance point of view would be to connect the longitudinal and circumferential mesh conductors directly (i.e. with no other coating material in the electrical circuit creating by the longitudinal and circumferential conductors). This way the mesh would have a lower electrical resistance, since no coating material would be in the main path taken by the current.

The superconductor shield can be made from any known type which is suitable for the purpose described. For example, the superconductor may be as Bismuth Strontium Calcium Copper Oxide (BSCCO), Yttrium Barium Copper Oxide (YBCO) or Magnesium Diboride ($MgB_2$). Methods of creating superconductors include: top-seeded melt growth (TSMG, as used to create bulk superconductors), infiltration and growth (IG method) or continuous tube forming and filling process (CTFAFP) often used to create copper plated/coated MgB2 filaments, powder in tube method, sputtering.

Other methods that could be used in the process include: hydroforming, electron beam welding, solution deposition planarization process, ion beam assisted deposition, electroplating.

Many methods exist for creating superconducting wires or tape and coating/embedding them in another material (usually a copper alloy), the choice of which depends on the superconducting material being used and cost. The mesh could be made by electrically connecting already plated superconducting wires together into a mesh by welding, soldering or compression.

In another embodiment, the method could include creating a thin sheet of superconducting material and piercing holes in it. The holes could be created using a high power jet of air or water, or with an electron beam or laser as known in the art. In another embodiment, the superconducting mesh could be made in a mesh shaped mould or some form of pressed moulding method.

Once the mesh is made it is tightly wrapped around, fixed and electrically connected to a more rigid structure, such as a steel cylinder.

High thermal conductivity materials can be added between the thermal path of the coolant and the superconducting screen to ensure sufficient cooling of the screen and thermal insulation on other thermal paths thus helping to reduce unwanted heat inleak to the superconducting screen.

The superconductor magnetic shield 14 is particularly advantageous as it has negligible electrical resistance when in a superconducting state and so the circulating eddy currents do not result in any losses. This makes for a very efficient magnetic shield. Further, because superconductors can tolerate large current densities, the radial thickness of the shield can be much reduced when compared to a more conventional eddy current shields and high magnetic permeability shields. This makes for a lighter shield which occupies less volume which is particularly advantageous for aerospace applications.

However, having a superconductor shield 14 is reliant on two factors. The first is that the magnetic field seen by the shield 14 is time varying in order for the required eddy currents to the induced. The second is that the shield 14 is retained in a superconducting state. Both of these factors can be relied upon during normal operation of the machine 12 and cryogenic system. However, in the event of particular faults the superconductor shield can fail, which would result in an unacceptable leakage of magnetic field to the surrounding environment.

Such faults may include an increase in the magnetic field, temperature or current density beyond the critical limits for the superconducting shield, which may occur, for example, under transient conditions in which the radial magnetic field increases beyond a design threshold. Another fault may occur when the rotational speed of the rotor drops below a predetermined speed at which time the induced currents would drop below the level required to produce the necessary magnetic fields. In order to account for transient related and other faults, the present invention provides a second shield 16 which surrounds the first, superconductor, magnetic shield 14 and acts as a backup shield in the event of a fault.

The second shield 16 can either be an eddy current shield made from a highly conductive material, such as copper or aluminium, or can be a material having a high magnetic permeability which acts to redirect the magnetic field back into the machine.

The first of these options, the eddy current shield, is advantageous in that it can be radially thinner when compared with a high permeability shield which makes for a lighter and less expensive construction. However, this type of shield will be non-responsive if the magnetic field emanating from the magnetic flux source through the superconductor shield 14 is not sufficiently time varying, for example, when the machining starting or if the rotational speed drops below a given threshold.

A high permeability second shield may be preferable as this does not rely upon a time varying magnetic field to be operable. Hence, it may be effective for starting the machine where the rotational speed of the machine is too low but the magnetic fields can be excessively high for the surrounding environment. Such a high permeability shield may be constructed from conventional materials such as laminated steel, or a ferrite, the latter of which may provide weight savings and aid with thermally insulating the machine due to a lower mass and thermal conductivity when compared to steel, respectively.

However, the radial thickness required from a high permeability magnetic shield to prevent leakage, when compared to the eddy current magnetic shield, is prohibitively large. Hence, the use of a high permeability shield may require the machine 12 to be run at a lower rating when the superconducting shield is inoperable.

In another embodiment, the superconductor shield and second shield may be proximate or possibly incorporated within a single composite structure. Such a composite may include approximately 30% superconductor and 70% conventional electrical conductor.

Figure 2:
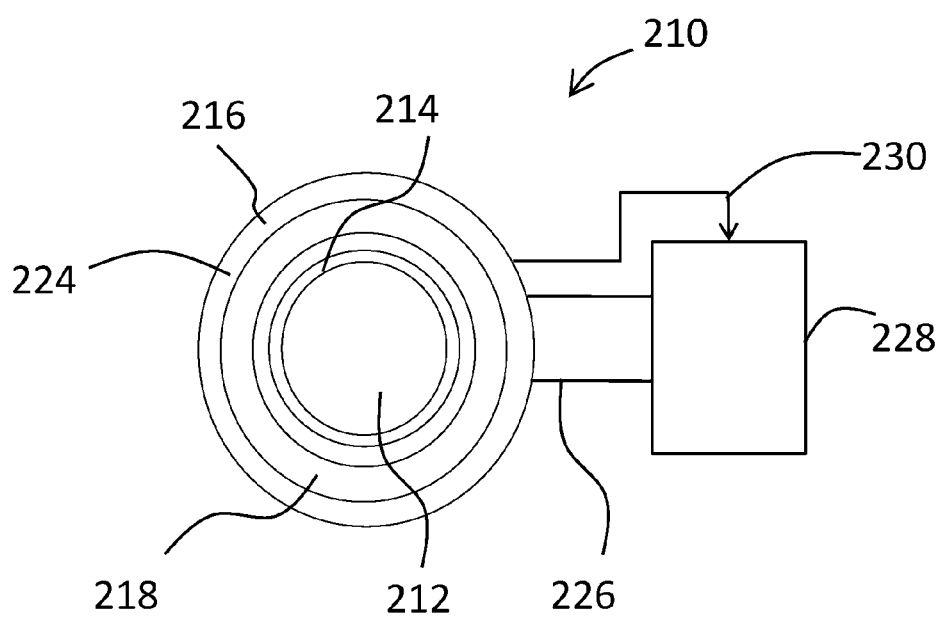
FIG. 2 shows a schematic cross sectional view of an alternative embodiment of the invention.

In another embodiment, as shown in FIG. 2, a further shield 224 is incorporated in an arrangement 210. Thus, there is shown an electrical machine 212 containing a magnetic flux source, superconductor shield 214, a second shield 216 and a third shield 224. The second shield can be an eddy current shield or high permeability shield as described for the first embodiment. The further, third shield 224 is preferably a high magnetic permeability shield which is used predominantly for starting purposes and for which an eddy current shield is ineffective.

Although the third shield is shown as being radially outwards of the superconducting and second shield, in another embodiment, the third shield is housed within the superconducting shield. This provides a configuration which allows a portion of the magnetic field produced by the magnetic flux source to redirected back into the machine with the effect of the flux density of the machine increasing as is known in the art.

Although any combination of shields is possible, it will be appreciated that the combination of a superconducting eddy current shield, an eddy current second shield and a high permeability start-up third shield is preferable as it provides shielding for the faults identified herein.

To allow the thickness of the start up shield to be reduced, the magnetic field produced by the machine may be reduced under start up conditions. This may either be achieved by using the a reduced level of current in the superconductor field windings, or by incorporating an alternative starter winding on the rotor such as an induction cage or the like which can be rotated by a rotating field in the already present stator winding. Another option would be to include a permanent magnet assembly on the rotor for starting purposes.

In operation, the electrical machines 12, 212 would be cooled to a point where the superconductor shield 14, 214 and superconductor rotor windings are put in a superconducting state. The machine 12, 212 can then be excited so as to create a rotational force on the rotor. During this phase, the magnetic field produced by the machine 12, 212 is maintained below a predetermined level which corresponds to the capability of the shields being used. As will be appreciated from the above description, this will be dependent on the type of shielding used and the particular geometry of the machine and shielding.

Once the machine is rotating at a sufficient speed, eddy currents will be set up in the superconducting shield and the magnetic field produced by the magnetic flux source can be increased. Operation of the machine can then be continued as required.

As stated above, the operation of the superconducting machine is dependent on the superconducting state of the shield and the time-varying nature of the magnetic field.

Hence, in one embodiment, as shown in FIG. 2, the electrical machine 212, or the system of which it is part, may include a control system which includes a controller 228 which receives signals 230 from one which has one or more sensors for determining the condition of the system or machine 212. By condition it is meant any electrical parameter or thermal parameter of the system or electrical machine which may be used to determine the magnitude of the magnetic field amplitude and frequency. The sensors may include but are not limited Hall effect devices such as search coils, or speed sensors which monitor the rotational speed of the machine 212.

Incorporating a control system in this way provides a means for monitoring the condition of the machine and deducing whether the shielding is sufficient. In instances where the shielding is determined not to be sufficient, the operation of the machine can be adjusted accordingly using the electrical supply 226 provided to the machine 212.

For example, if a speed sensor determines that the rotational speed drops below a predetermined threshold, the power provided to the machine may be limited so as to reduce the shielding requirement. In another example, the power may be dropped if the magnetic field at the superconducting shield approaches or exceeds a predetermined level.

Other alternatives are available within the scope of the invention. For example, the shields may comprise one or more electromagnets which can be selectively energised to oppose the magnetic field produced by the magnetic flux source if the superconducting shield fails.

Although the invention has been described with the above embodiments, these should not be seen as limiting. The scope of the invention is defined by the claims below.

The invention claimed is:

1. A superconducting rotary electrical machine having a winding on a rotor and a winding on a stator, wherein
at least one of the winding on the rotor and the winding on the stator is a superconducting winding;
a superconductor magnetic shield comprised of a superconducting material on the outside of the stator and at least partially surrounding the windings on the rotor and the stator; and
a second magnetic shield at least partially surrounding the superconductor magnetic shield.

2. The superconducting rotary electrical machine as claimed in claim 1, wherein the second magnetic shield is constructed from a material having a high magnetic permeability.

3. The superconducting rotary electrical machine as claimed in claim 1, wherein the second magnetic shield is constructed from a non-superconducting electrically conductive material.

4. The superconducting rotary electrical machine as claimed in claim 1 further comprising a third magnetic shield.

5. The superconducting rotary electrical machine as claimed in claim 4, wherein the third magnetic shield is substantially constructed from a high magnetic permeability material.

6. The superconducting rotary electrical machine as claimed in claim 1 further comprising a thermal barrier between the superconductor magnetic shield and the second magnetic shield.

7. The superconducting rotary electrical machine as claimed in claim 1, wherein, when in use, the superconductor magnetic shield is exposed to a time varying magnetic field and the magnetic shielding arrangement further comprises at least one sensor for determining when a frequency or amplitude of the time varying magnetic field is outside a predetermined range.

8. The superconducting rotary electrical machine as claimed in claim 1, wherein the superconducting winding is part of an electrical machine that is configured to operate as a motor and the superconducting winding is placed on a rotor, the rotor further comprising a non-superconductor winding for starting purposes.

9. The superconducting rotary electrical machine as claimed in claim 5, wherein the third magnetic shield is provided between the superconducting winding and the superconductor magnetic shield.

10. The superconducting rotary electrical machine as claimed in claim 1, wherein the superconductor magnetic shield includes a mesh of superconductor wires.

11. The superconducting rotary electrical machine as claimed in claim 10, wherein each superconductor wire comprises superconductor filaments coated with a non-superconductor electrical conductor.

12. The superconducting rotary electrical machine as claimed in claim 1, wherein the superconductor magnetic shield includes a plurality of layers.

13. A method of operating the superconducting rotary electrical machine having the magnetic shielding arrangement as claimed in claim 1, the method comprising:
putting the superconductor magnetic shield in a superconducting state; and
energizing or magnetizing the superconducting winding.

14. A method of operating the superconducting rotary electrical machine as claimed in claim 13, wherein the magnetic shielding arrangement includes at least one sensor for monitoring a condition of the magnetic shielding arrangement, the method further comprising:
monitoring at least one condition of the superconducting rotary electrical machine; and,
controlling a magnetic field produced by the superconducting winding in accordance with the at least one monitored condition such that the magnetic field is maintained within predetermined limits that can be tolerated by the superconductor magnetic shield and the second magnetic shield.

* * * * *